United States Patent
Kumano et al.

(10) Patent No.: US 9,665,780 B2
(45) Date of Patent: May 30, 2017

(54) TRAVEL DIVISION LINE RECOGNITION APPARATUS AND TRAVEL DIVISION LINE RECOGNITION PROGRAM

(71) Applicant: DENSO CORPORATION, Kariya, Aichi-pref. (JP)

(72) Inventors: Syunya Kumano, Gothenburg (SE); Naoki Kawasaki, Kariya (JP); Shunsuke Suzuki, Aichi-ken (JP); Tetsuya Takafuji, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1 day.

(21) Appl. No.: 14/665,244

(22) Filed: Mar. 23, 2015

(65) Prior Publication Data
US 2015/0269447 A1 Sep. 24, 2015

(30) Foreign Application Priority Data
Mar. 24, 2014 (JP) ................................ 2014-060280

(51) Int. Cl.
*G06K 9/00* (2006.01)
*G06K 9/62* (2006.01)

(52) U.S. Cl.
CPC ..... *G06K 9/00798* (2013.01); *G06K 9/00805* (2013.01); *G06K 9/6293* (2013.01)

(58) Field of Classification Search
None
See application file for complete search history.

(56) References Cited

U.S. PATENT DOCUMENTS 4,970,653 A * 11/1990 Kenue ................ G06T 7/00
348/116
5,402,118 A * 3/1995 Aoki ................ G08G 1/04
340/933

(Continued)

FOREIGN PATENT DOCUMENTS

JP H10283477 A * 10/1998
JP 2006-140636 6/2006
JP 2006-331389 12/2006

OTHER PUBLICATIONS

Lai et al., "Vehicle Type Classification from Visual-Based Dimension Estimation", 2001 IEEE Intelligent Transportation Systems Conference Proceedings, pp. 201-206.*

*Primary Examiner* — Vu Le
*Assistant Examiner* — Samah Beg
(74) *Attorney, Agent, or Firm* — Harness, Dickey & Pierce, P.L.C.

(57) ABSTRACT

In a travel division line recognition apparatus, an extracting unit extracts a travel division line candidate from an image of a surrounding environment including a road, captured by an on-board camera. A calculating unit calculates a degree of reliability that the extracted travel division line candidate will be the travel division line. A recognizing unit selects the travel division line candidate based on the calculated degree of reliability, and recognizes the travel division line using the selected travel division line candidate. In the calculating unit, a solid object processing unit recognizes solid objects including vehicles, sets a suppression area including a frontal-face suppression area covering a frontal face of the other vehicle and a side-face suppression area covering a side face of the other vehicle, based on the recognized solid objects, and reduces the degree of reliability of the travel division line candidate present within the suppression area.

18 Claims, 5 Drawing Sheets

(56) References Cited

U.S. PATENT DOCUMENTS

| | | | | |
|---|---|---|---|---|
| 5,765,116 A * | 6/1998 | Wilson-Jones | ...... | G05D 1/0246 180/168 |
| 6,813,370 B1 * | 11/2004 | Arai | ................... | G06K 9/00798 340/908.1 |
| 8,108,119 B2 * | 1/2012 | Southall | .................... | B60T 7/22 382/103 |
| 8,923,605 B2 * | 12/2014 | You | ................... | G06K 9/00208 382/154 |
| 9,530,063 B2 * | 12/2016 | Kumano | ............ | G06K 9/00798 |
| 2003/0174054 A1 * | 9/2003 | Shimomura | ............ | G01S 7/415 340/435 |
| 2004/0080449 A1 * | 4/2004 | Horibe | ................. | G01S 7/4026 342/70 |
| 2004/0247157 A1 * | 12/2004 | Lages | .................. | G06K 9/00805 382/103 |
| 2004/0258279 A1 * | 12/2004 | Hirvonen | .......... | G06K 9/00201 382/104 |
| 2005/0125121 A1 * | 6/2005 | Isaji | ..................... | B60W 30/08 701/36 |
| 2005/0131646 A1 * | 6/2005 | Camus | ................. | B60R 21/013 701/301 |
| 2006/0239509 A1 * | 10/2006 | Saito | .................... | G06K 9/6205 382/104 |
| 2007/0075892 A1 * | 4/2007 | Horibe | ................. | G01S 17/023 342/70 |
| 2008/0024325 A1 * | 1/2008 | Kobayashi | ......... | G06K 9/00825 340/939 |
| 2008/0169912 A1 * | 7/2008 | Kawasaki | ......... | G06K 9/00825 340/425.5 |
| 2008/0170754 A1 * | 7/2008 | Kawasaki | ......... | G06K 9/00825 382/104 |
| 2008/0219505 A1 * | 9/2008 | Morimitsu | ........ | G06K 9/00201 382/103 |
| 2009/0010482 A1 * | 1/2009 | Nishida | ............. | G06K 9/00798 382/100 |
| 2009/0174808 A1 * | 7/2009 | Mochida | .................. | G03B 7/28 348/362 |
| 2010/0266161 A1 * | 10/2010 | Kmiecik | ................ | G01C 21/26 382/103 |
| 2011/0044507 A1 * | 2/2011 | Strauss | ............... | B60R 21/0134 382/103 |
| 2011/0216938 A1 * | 9/2011 | Suzuki | .................... | G06K 9/00 382/103 |
| 2011/0216944 A1 * | 9/2011 | Kawasaki | ............... | G06K 9/00 382/104 |
| 2012/0078498 A1 * | 3/2012 | Iwasaki | ................ | B60W 10/06 701/300 |
| 2012/0194677 A1 * | 8/2012 | Suzuki | ............... | G06K 9/00798 348/148 |
| 2012/0229644 A1 * | 9/2012 | Suzuki | ............... | G06K 9/00798 348/148 |
| 2013/0272577 A1 * | 10/2013 | Sakamoto | .............. | G08G 1/167 382/103 |
| 2014/0236482 A1 * | 8/2014 | Dorum | ................... | G01C 21/34 701/533 |
| 2015/0161457 A1 * | 6/2015 | Hayakawa | ............. | G08G 1/166 348/46 |
| 2015/0186733 A1 * | 7/2015 | Hayakawa | ............. | G08G 1/166 382/103 |
| 2015/0199577 A1 * | 7/2015 | Kim | ................... | G06K 9/00798 348/148 |
| 2015/0235090 A1 * | 8/2015 | Kumano | ........... | G06K 9/00798 340/435 |
| 2015/0235091 A1 * | 8/2015 | Kumano | ........... | G06K 9/00798 340/435 |
| 2015/0294164 A1 * | 10/2015 | Sakamoto | ............ | G06K 9/4604 382/104 |
| 2015/0302611 A1 * | 10/2015 | Fan | ........................ | G06T 7/602 382/104 |
| 2015/0310283 A1 * | 10/2015 | Mori | .................... | B60W 30/12 382/104 |
| 2016/0121889 A1 * | 5/2016 | Shimomura | .......... | B60W 30/12 701/41 |

\* cited by examiner

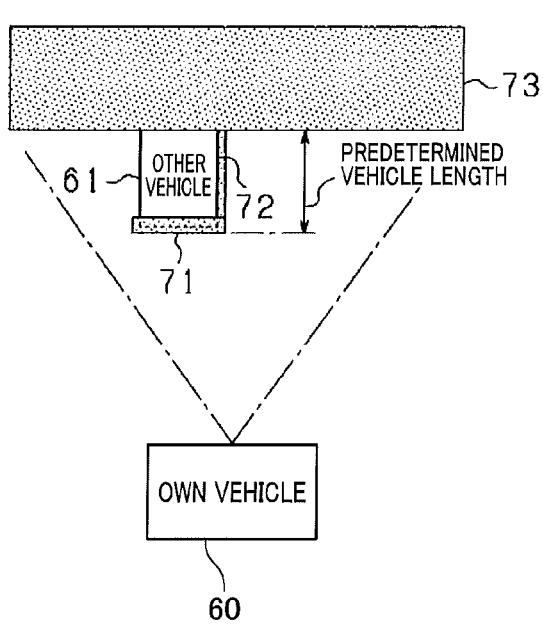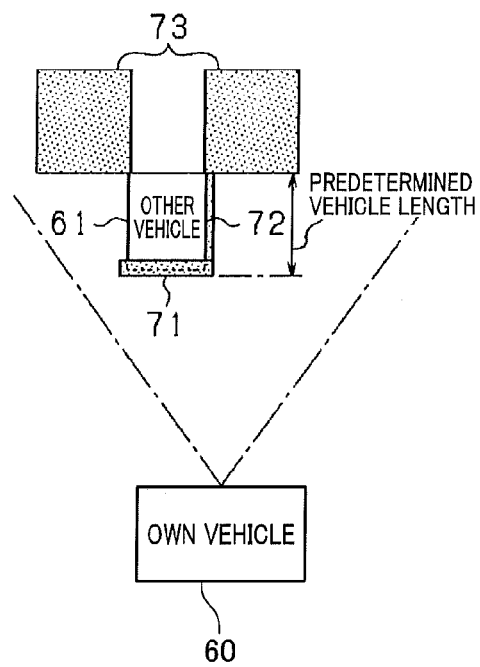

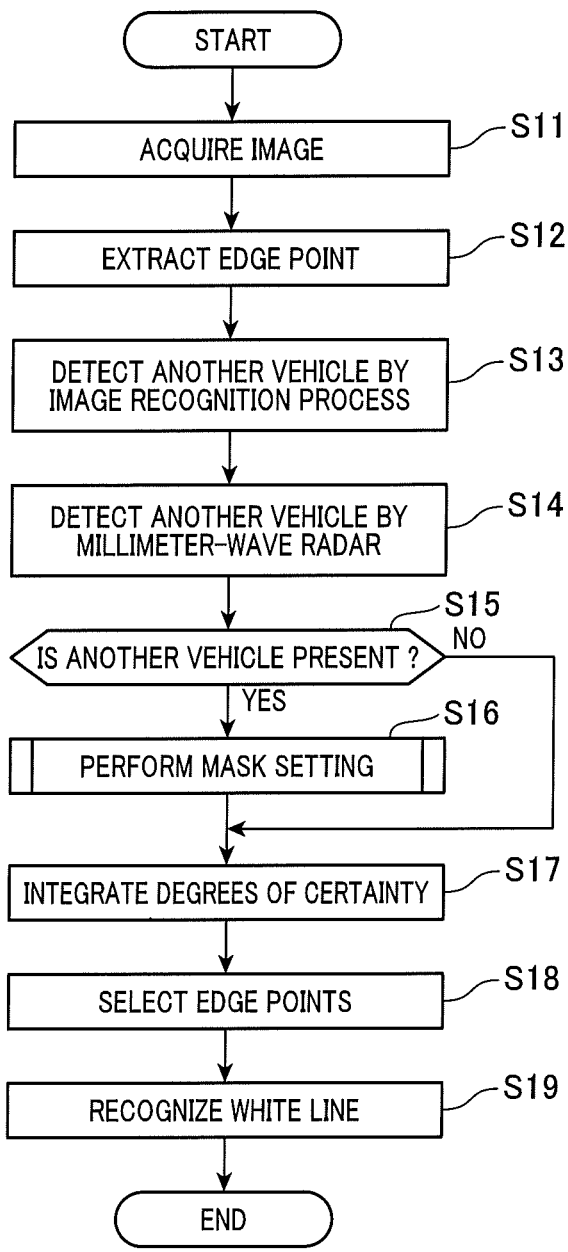

TRAVEL DIVISION LINE RECOGNITION APPARATUS AND TRAVEL DIVISION LINE RECOGNITION PROGRAM

CROSS-REFERENCE TO RELATED APPLICATION

This application is based on and claims the benefit of priority from Japanese Patent Application No. 2014-060280, filed Mar. 24, 2014, the disclosure of which is incorporated herein in its entirety by reference.

BACKGROUND

Technical Field

The present invention relates to an apparatus and a program for recognizing a travel division line on a road on a road from images captured by an on-board camera.

Related Art

Apparatuses have been proposed that recognize a travel division line on a road from images captured by an on-board camera, and use the recognized travel division line for driving assistance. Among such apparatuses, there is an apparatus that eliminates the edges of solid objects, such as vehicles, from the images to accurately recognize the travel division line.

For example, in JP-A-2006-331389, stereo images that have been captured by a pair of on-board cameras are used. Solid objects are surrounded by frames and extracted from the scenery ahead. A search area over which a search for edge points of a travel division line is performed is set in an area excluding the extracted solid objects.

When a vehicle is recognized from a monocular image, it may not be possible to calculate the depth of the vehicle. Moreover, even when a vehicle is recognized from stereo images, the accuracy of depth calculation of the vehicle may be low.

When the edges of a vehicle are eliminated without taking into consideration the depth of the vehicle, the elimination of vehicle edges may be insufficient. In addition, when the edges of a vehicle are eliminated using inaccurate depth, the elimination of vehicle edges may be excessive or insufficient. There is a risk that elimination of vehicle edges may not be stably performed. As a result, erroneous recognition of cruising the travel division line may occur, leading to a decrease in the recognition rate of the travel division line.

SUMMARY

It is thus desired to provide a travel division line recognition apparatus that is capable of stably eliminating the edges of other vehicles, and suppressing erroneous recognition and decrease in the recognition rate of a travel division line.

An exemplary embodiment provides a travel division line recognition apparatus that includes an extracting unit, a calculating unit, and a recognizing unit. The extracting unit extracts a travel division line candidate from an image of a surrounding environment including a road, captured by an on-board camera. The travel division line candidate is a candidate for a travel division line on the road. The calculating unit calculates a degree of reliability that the travel division line candidate extracted by the extracting unit will be the travel division line. The recognizing unit selects the travel division line candidate based on the degree of reliability calculated by the calculating unit and recognizes the travel division line using the selected travel division line candidate.

The calculating unit includes a solid object processing unit that sets a suppression area based on the recognition of solid objects including vehicles, and reduces the degree of reliability of the division line candidate present within the suppression area. The suppression area includes a frontal-face suppression area and a side-face suppression area. The frontal-face suppression area is set so as to cover a frontal face of another vehicle in a position in which the frontal face has been recognized. The side-face suppression area is set so as to cover a side face that is formed by extending the frontal-face suppression area in a depth direction by a predetermined vehicle length.

In the present invention, the travel division line candidate is extracted from an image captured by the on-board camera. The degree of reliability that the extracted travel division line candidate will be travel division line is calculated. Then, the travel division line candidate is selected based on the calculated degrees of certainty of the travel division line candidates. The travel division line is recognized using the selected travel division line candidate. At this time, the suppression area is set based on recognition of solid objects including vehicles. The degree of reliability of a travel division line present within the suppression area is reduced. Therefore, recognition of the edges of solid objects within the suppression area as a division line is suppressed.

The suppression area includes the front-face suppression area and the side-face suppression area. The frontal-face suppression area is set so as to cover the frontal face of another vehicle in the position in which the frontal face has been recognized. The side-face suppression area is set so as to cover the side face that is formed by extending the frontal-face suppression area in the depth direction by a predetermined vehicle length.

Therefore, when the frontal face of the vehicle is recognized, it is possible to prevent the edges of another vehicle that present on the side face that is formed by extending the frontal-face suppression area in the depth direction by the predetermine vehicle length that is set to the depth of the vehicle, from being recognized as a division line, even when the depth of the vehicle is not acquired. Therefore, elimination of the edges of another vehicle can be stably performed. Moreover, erroneous recognition of a travel division line can be suppressed, and decrease in the recognition rate of a travel division line can be suppressed.

BRIEF DESCRIPTION OF THE DRAWINGS

In the accompanying drawings:

FIG. 4A and FIG. 4B are planar views of states in which masks are set beyond a predetermined vehicle length from a frontal-face mask;

FIG. 5 is a flowchart of a process for recognizing white lines; and

DESCRIPTION OF EMBODIMENTS

An embodiment of a travel division line recognition apparatus will hereinafter be described with reference to the drawings. The travel division line recognized by the travel division line recognition apparatus according to the present embodiment are used in lane keeping assist (LKA) control and lane deviation warning.

Figure 1:
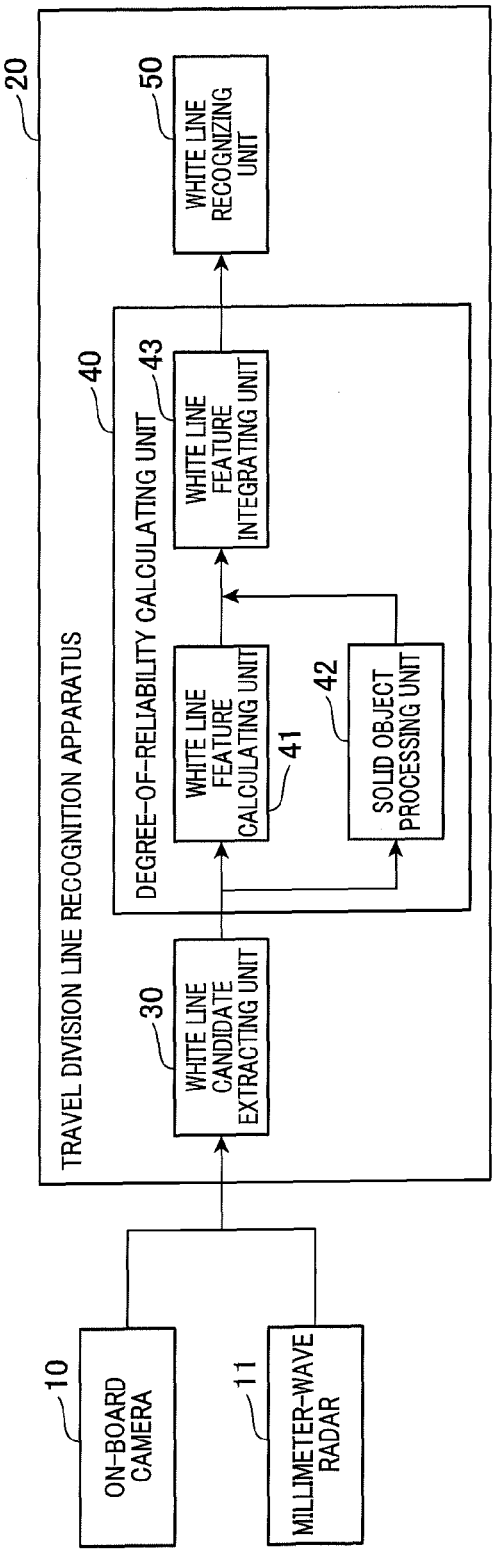
FIG. 1 is a block diagram of a configuration of a travel division line recognition apparatus according to an embodiment.

First, a configuration of the travel division line recognition apparatus according to the present embodiment will be described with reference to FIG. 1. A travel division line recognition apparatus 20 according to the present embodiment is an on-board apparatus that recognizes white lines (division lines) on a road using images from an on-board camera 10 and the detection results from a millimeter-wave radar 11.

Figure 2:
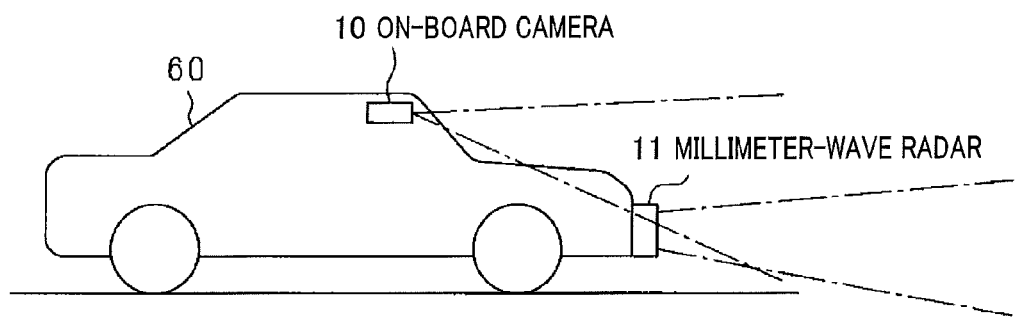
FIG. 2 is a side view of a vehicle indicating the placements of an on-board camera and a millimeter-wave radar.

The on-board camera 10 is configured by at least one of a charge-coupled device (CCD) camera, a complementary metal-oxide-semiconductor (CMOS) image sensor, and a near-infrared camera. As shown in FIG. 2, the on-board camera 10 is mounted on an own vehicle 60 so as to capture images of the surrounding environment, including the road ahead of the own vehicle 60. Specifically, the on-board camera 10 is set near the upper end of the front windshield of the own vehicle 60 and captures images an area that spreads over a predetermined angular range ahead of the vehicle. The on-board camera 10 may be configured by a stereo camera or a plurality of cameras.

As shown in FIG. 2, the millimeter-wave radar 11 is set at the front of the own vehicle 60. The millimeter-wave radar 11 transmits millimeter waves ahead of the own vehicle 60 and receives reflected waves that have returned after being reflected by a solid object. By receiving the reflected waves, the millimeter-wave radar 11 detects the direction in which the solid object is present, the distance to the solid object, and the shape of the solid object.

The travel division line recognition apparatus 20 is a computer that includes a central processing unit (CPU), a random access memory (RAM), a read-only memory (ROM), an input/output (I/O), and the like. The CPU runs a travel division line recognition program that is installed in the ROM, thereby actualizing various functions of a white line candidate extracting unit 30, a degree-of-reliability calculating unit 40, and a white line recognizing unit 50. The computer may also read out a travel division line recognition program that is stored on a recording medium.

The white line candidate extracting unit 30 extracts white line candidates (division line candidates) on the road from the images captured by the on-board camera 10. The white line candidates are composed of edge points.

The degree-of-reliability calculating unit 40 includes a white line feature calculating unit 41, a solid object processing unit 42, and a white line feature integrating unit 43.

The degree-of-reliability calculating unit 40 calculates the degree of reliability (likelihood) of the white line candidate extracted by the white line candidate extracting unit 30 being a white line. The probability of the white line candidate being a white line increases as the degree of reliability of the white line candidate increases.

The white line feature calculating unit 41 calculates the degree of reliability of the white line candidates to be higher as the level of a provided feature increases, for each of a plurality of white line features. The plurality of white line features are, for example, the edge strength being stronger than a threshold and the edge points being aligned on a substantially straight line.

The white line feature integrating unit 43 integrates the degree of reliability corresponding to each white line feature calculated by the white line feature calculating unit 41 and the degree of reliability calculated by the solid object processing unit 42, and then calculates the integrated degree of reliability.

The solid object processing unit 42 sets masks (suppression areas) in an image based on the recognition of solid objects including another vehicle 61. Recognition of solid objects is performed using the images captured by the on-board camera 10 and the detection results from the millimeter-wave radar 11.

Furthermore, the solid object processing unit 42 reduces the integrated degree of reliability of a white line candidate present within a mask and suppresses recognition of the white line candidate present within the mask as a white line. Specifically, the solid object processing unit 42 calculates the degree of reliability of a white line candidate present within a mask to be lower than that of a white line candidates present outside of a mask so that the integrated degree of reliability is a first threshold or lower, when the degrees of certainty corresponding to each feature are integrated.

Figure 3:
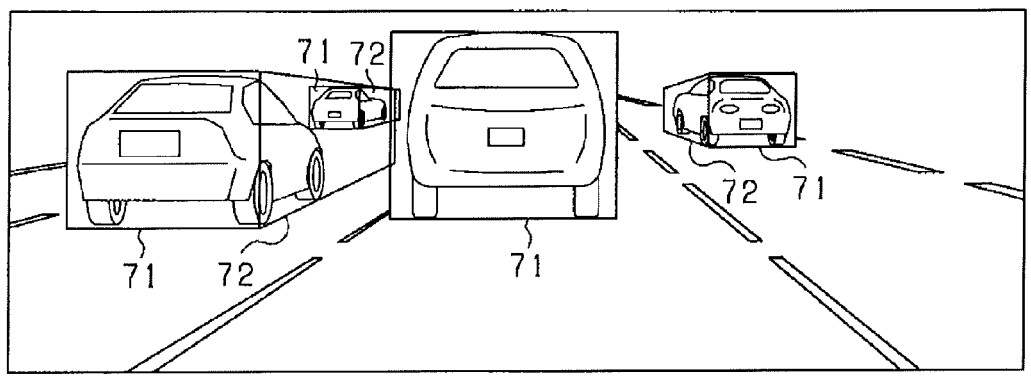
FIG. 3 is a diagram of a state in which masks are set on the frontal faces and side faces of vehicles in an image.

As shown in FIG. 3 and FIG. 4, the mask includes a frontal-face mask 71 (frontal-face suppression area), a side-face mask 72 (side-face suppression area), and a distant mask 73 (distant suppression area). The frontal-face mask 71 is set so as to cover the frontal face of the other vehicle 61. The frontal face refers to the face of the other vehicle 61 that faces the own vehicle 60. The side-face mask 72 is set taking into consideration depth, which is a predetermined vehicle length. The distant mask 73 is set beyond the predetermined vehicle length from the frontal-face mask 71.

The white line recognizing unit 50 selects a white line candidate of which the degree of reliability integrated by the white line feature integrating unit 43 is a threshold or higher. The white line recognizing unit 50 then recognizes a white line using the selected white line candidates.

Next, a process for recognizing the white line will be described with reference to the flowchart in FIG. 5. The present process is repeatedly performed by the travel division line recognition apparatus 20 at a predetermined interval. In the present process, only the other vehicles 61 are considered as the detected solid objects.

First, the travel division line recognition apparatus 20 acquires an image captured by the on-board camera 10 (step S11). Next, the travel division line recognition apparatus 20 extracts edge points having large luminance change rates in the horizontal direction of the image, using a filter such as a Sobel filter on the image acquired at step S11 (step S12). The extracted edge points are set as the white line candidates.

Next, the travel division line recognition apparatus 20 detects another vehicle 61 present ahead of the own vehicle 60 from the image acquired at step S11 (step S13). Specifically, the travel division line recognition apparatus 20 detects the shape of a frontal face of a vehicle registered in advance in the image acquired at step S11, through a known image recognition process.

The frontal face of another vehicle 61 in an oncoming lane may be captured in the image, in addition to the rear face of another vehicle 61 that is traveling in the same advancing direction. Therefore, the frontal face of a vehicle includes the rear face and the front face of a vehicle.

Next, the travel division line recognition apparatus 20 detects another vehicle 61 present ahead of the own vehicle 60 using the millimeter-wave radar 11 (step S14). Specifically, the travel division line recognition apparatus 20 detects the shape of a frontal face of a vehicle registered in advance from the intensity distribution of reflected waves received by the millimeter-wave radar 11.

Next, at step S13 or S14, the travel division line recognition apparatus 20 determines whether or not the frontal face of another vehicle 61 is detected (step S15). When determined that the frontal face of another vehicle 61 is detected (YES at step S15), the travel division line recognition apparatus 20 sets a mask in the area corresponding to the other vehicle 61 (step S16). Mask setting will be described in detail hereafter. Conversely, when determined that the frontal face of another vehicle 61 is not detected (NO at step S15), the travel division line recognition apparatus 20 does not perform the mask setting process and proceeds to the process at step S17.

Next, the travel division line recognition apparatus 20 calculates the degree of reliability that an edge point will be a white line, for each of the edge points and for each of a plurality of white line features (step S17). The travel division line recognition apparatus 20 then integrates the calculated degrees of certainty. When the mask setting process is performed, the degree of reliability calculated during the mask setting process is also integrated.

Next, the travel division line recognition apparatus 20 selects the edge points of which the degree of reliability calculated at step S17 is higher than the first threshold, among the edge points extracted at step S12 (step S18).

Next, the travel division line recognition apparatus 20 recognizes the white line using the edge points selected at step S18. Specifically, the travel division line recognition apparatus 20 performs a Hough transform on the edge points selected at step S18, and recognizes a straight line passing through the most number of edge points as the white line. Edge points of which the degree of reliability calculated at step S17 is lower than the first threshold are not used for white line recognition.

Figure 6:
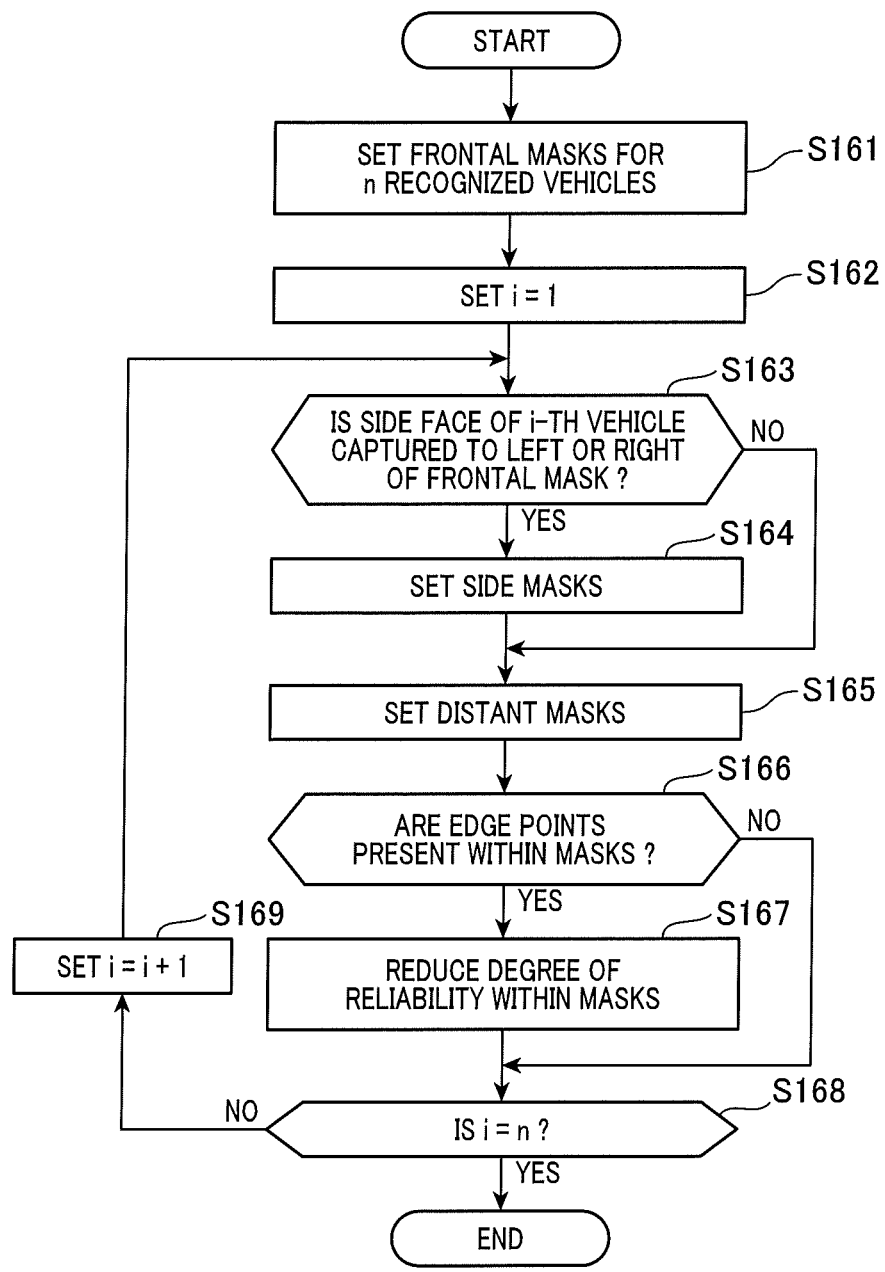
FIG. 6 is a flowchart of a process for setting masks.

Next, the process for mask setting (step S16) will be described with reference to the flowchart in FIG. 6. According to the present embodiment, it is presumed that the frontal faces of a total of n-number of other vehicles 61 have been detected through the processes at steps S13 and S14. The frontal faces of the n-number of other vehicles 61 are respectively numbered 1 to n.

First, the travel division line recognition apparatus 20 sets the square frontal-face mask 71 so as to cover the frontal face of the other vehicle 61 in the position where the frontal face of the other vehicle 61 has been recognized by the image recognition process and the millimeter-wave radar 11. The travel division line recognition apparatus 20 sets an n-number of frontal-face masks 71 in correspondence with the frontal faces of the n-number of recognized other vehicles 61 (step S161).

Next, the travel division line recognition apparatus 20 sets the value of i to an initial value 1 (step S162). Next, the travel division line recognition apparatus 20 selects the i-th vehicle from among the n-number of other vehicles 61. The travel division line recognition apparatus 20 then determines whether a side face of the i-th vehicle is captured in the image to the left or right of the frontal-face mask 71 that has been set on the frontal face of the i-th vehicle (step S163). In other words, the travel division line recognition apparatus 20 determines whether or not the span of the i-th vehicle in the depth direction is required to be considered.

When the frontal face of the i-th vehicle is present to the left of the center of the image in the lateral direction, or in other words, the position of the own vehicle 60, the side face to the right of the frontal face of the i-th vehicle is captured in the image. In a similar manner, when the frontal face of the i-th vehicle is present to the right of the center of the image in the lateral direction, the side face to the left of the frontal face of the i-th vehicle is captured in the image.

Therefore, when the frontal-face mask 71 that has been set on the i-th vehicle is set to the left or right of a predetermined area in the center of the image in the lateral direction, the travel division line recognition apparatus 20 determines that the side face of the i-th vehicle is captured in the image (present in the image) (YES at step S163) and proceeds to the setting process for the side-face mask 72 (step S164).

Conversely, when the frontal-face mask 71 that has been set on the i-th vehicle is set in the vicinity of the center of the image in the lateral direction, as in the instance of the vehicle traveling in the center lane in FIG. 3, the travel division line recognition apparatus 20 determines that the side face of the i-th vehicle is not captured in the image (NO at step S163). In this case, the span of the i-th vehicle in the depth direction is not required to be considered. Therefore, the travel division line recognition apparatus 20 proceeds to the setting process for the distant mask 73 (step S165) without performing the setting process for the side-face mask 71.

In the setting process for the side-face mask 72 (step S164), when the frontal-face mask 71 of the i-th vehicle is set to the left of the vicinity of the center of the image in the lateral direction, as in the instance of the vehicle traveling in the left lane in FIG. 3, the travel division line recognition apparatus 20 sets the side-face mask 72 on the right side of the frontal-face mask 71 Specifically, the square side-face mask 72 is set so as to cover a side face that is formed by extending the front mask 71 in the depth direction by the predetermined vehicle length.

FIGS. 4A and 4B are planar views showing the positional relationship between the own vehicle 60, the other vehicle 61 (i-th vehicle), and the masks. The side face that is formed by extending the frontal-face mask 71 of the other vehicle 61 in the depth direction by a predetermined vehicle length in actual space, or in other words, the area formed by the height of the frontal-face mask 71 and the width of the predetermined vehicle length in actual space is converted to an area in the image and set as the side-face mask 72. In this way, the side-face mask is set in the position corresponding to the side face of the i-th vehicle in the image.

In a similar manner, when the frontal-face mask 71 of the i-th vehicle is set to the right of the vicinity of the center of the image in the lateral direction, as in the instance of the vehicle traveling in the right lane in FIG. 3, the side-face mask 72 is set on the left side of the frontal-face mask 71.

Here, taking into consideration the worst case scenario, the predetermined vehicle length is set to an average vehicle length (fixed value) of a large-size vehicle, such as a truck. Alternatively, because the vehicle length generally becomes longer as the lateral width of the vehicle increases, the predetermined vehicle length may be set so as to become longer as the lateral width of the frontal face of the i-th vehicle, recognized by the image recognition process or the millimeter-wave radar 11, becomes wider.

In addition, the vehicle may be classified into a large-size vehicle, a medium-size vehicle, a compact vehicle, or the like, based on the lateral width of the i-th vehicle. A vehicle length set in advance for each classification may be used as the predetermined vehicle length. The lateral width of the i-th vehicle can be calculated from the apparent width in the image and the distance to the frontal face of the i-th vehicle. The distance to the frontal face of the i-th vehicle can be detected by image processing or by the millimeter-wave radar 11.

Next, the travel division line recognition apparatus 20 sets the distant mask 73 (step S165). When a vehicle is present ahead of the i-th vehicle, the vehicle may be captured in the image so as to be shifted in the lateral direction from the i-th vehicle. In such cases, only a portion of the frontal face of the vehicle ahead is captured in the image. Therefore, recognition of the frontal face by image processing may be difficult. In addition, the millimeter-wave radar 11 is also only capable of detecting a portion of the frontal face. Therefore, recognition of the frontal face of the vehicle ahead may be difficult.

Therefore, as shown in FIG. 4A and FIG. 4B, the distant mask 73 is set so as to cover an area beyond the predetermined vehicle length from the frontal-face mask 71 and wider in the lateral direction than the frontal-face mask 71. The edge points of the other vehicle 61 that are present further ahead of the i-th vehicle and covered by the frontal-face mask 71 have a reduced degree of reliability because of the frontal-face mask 71. Therefore, the distant mask 73 may be set regardless of the frontal-face mask 71 as shown in FIG. 4A, or only in areas that are not covered by the frontal-face mask 71 as shown in FIG. 4B.

Here, the vehicle ahead of the leading vehicle is captured in the image so as to be significantly shifted in the lateral direction as the curvature of the lane increases. Therefore, the lateral width of the distant mask 73 is set to be wider as the curvature of the lane increases. Specifically, when the lane curves to the right, the distant mask 73 is set so as to be wider to the right of the frontal-face mask 71. In a similar manner, when the lane curves to the left, the distant mask 73 is set so as to be wider to the left of the frontal-face mask 71.

Curvature that has been acquired in advance is used as the curvature of the lane. Specifically, the curvature of the lane acquired from navigation information or the curvature of the lane calculated from the white lines recognized in a previous white line recognition process is used.

Next, the travel division line recognition apparatus 20 determines whether or not the edge points extracted at step S12 are present within the frontal-face mask 71, the side-face mask 72, and the distant mask 73 (step S166). When determined that the edge points are not present in the masks (NO at step S166), the travel division line recognition apparatus 20 proceeds to S168.

On the other hand, when determined that an edge point is present within the masks (YES at step S166), the travel division line recognition apparatus 20 calculates the degree of reliability of the edge point within the masks to be low, so as to set the degree of reliability to be the first threshold or lower when the degrees of certainty are integrated at step S17 (step S167).

Next, the travel division line recognition apparatus 20 determines whether or not the value of i has reached n, or in other words, whether or not the mask setting process has been performed for all recognized other vehicles 61 (step S168).

When determined that the value of i has reached n (YES at step S168), or in other words, when determined that the mask setting process has been completed for all recognized other vehicles 61, the travel division line recognition apparatus 20 ends the present process. Conversely, when determined that the value of i has not reached n (NO at step S168), the travel division line recognition apparatus 20 increases the value of i by 1 (step S169). The travel division line recognition apparatus 20 repeats the processes at steps S163 to S168 for the next other vehicle 61.

According to the present embodiment described above, the following effects can be achieved.

In the present invention, edge points, which are white line candidates, are extracted from an image captured by the on-board camera 10. The degree of reliability that the extracted edge point will be a white line is calculated. Then, edge points are selected based on the calculated degrees of certainty of the edge points, and the white line is recognized using the selected edge points. At this time, masks are set based on the recognition of solid objects, including other vehicles 61. The degree of reliability of an edge point present within a mask is reduced. Therefore, the recognition of an edge point of a solid object within a mask as a white line is suppressed.

The above-described masks include the frontal-face mask 71 and the side-face mask 72. The frontal-face mask 71 is set so as to cover a frontal face of another vehicle 61 in a position in which the frontal face has been recognized. The side-face mask 72 is set so as to cover a side face that is formed by extending the frontal-face mask 71 in the depth direction by a predetermined vehicle length.

Therefore, when the frontal face of the other vehicle 61 is recognized, it is possible to prevent an edge point of the other vehicle 61, which presents on the side face formed by extending the frontal-face mask 71 in the depth direction by the predetermined vehicle length that is set to the vehicle length of the other vehicle 61, from being recognized as white line, even when the vehicle length information of the other vehicle 61 is not acquired. As a result, elimination of vehicle edge points can be stably performed. Moreover, erroneous recognition of white lines can be suppressed, and decrease in the recognition rate of white lines can be suppressed.

A vehicle may be present ahead of the leading vehicle and may be captured in the image so as to be shifted in the lateral direction from the leading vehicle. The distant mask 73 is set so as to cover an area beyond the predetermined vehicle length from the frontal-face mask 71 and wider than the frontal-face mask 71 in the lateral direction. As a result, even when another vehicle is present ahead of the leading vehicle, the edge points of the vehicle present ahead of the leading vehicle can be eliminated with certainty.

The vehicle that is present ahead of the leading vehicle appears in the image so as to be shifted further in the lateral direction from the leading vehicle, as the curvature of the road increases. Therefore, the width of the distant mask 73 in the lateral direction is set based on the curvature of the road. As a result, even when the road is curved, the edge points of the vehicle present ahead of the leading vehicle can be eliminated with certainty.

In general, the vehicle length increases as the lateral width of the vehicle increases. Therefore, the predetermined vehicle length is set to become longer as the lateral width of the recognized other vehicle 61 becomes wider. As a result, the side-face mask 72 can be appropriately set, and the edge points of the other vehicle 61 can be eliminated with certainty.

Other Embodiments

The edge points within the masks may be eliminated, and the white line may be recognized using edge points other than those within the masks. In other words, the degree of reliability of edge points within the mask may be set to zero.

The vehicle length information of the other vehicle 61 is acquired when the vehicle length information may be acquired. When the reliability of the acquired vehicle length information is higher than a second threshold, the predetermined vehicle length may be set using the acquired vehicle length information. When the reliability of the acquired vehicle length information is the second threshold or lower, a predetermined vehicle length of a fixed value or a predetermined vehicle length set based on the lateral width of the vehicle may be used.

The vehicle length information may be acquired by estimation through image processing of images captured by the on-board camera 10, and stereo images in particular. In this case, the reliability of the vehicle length information is set based on the accuracy of the estimation of vehicle length information.

In addition, when the own vehicle 60 and the other vehicle 61 are each provided with an inter-vehicle communication apparatus, the vehicle length information may be acquired from the other vehicle 61 through inter-vehicle communication performed between the own vehicle 60 and the other vehicle 61. In this case, highly reliable vehicle length information can be acquired.

In addition, the vehicle type of the other vehicle 61 may be estimated by the frontal-face image of the other vehicle 61 being processed. The vehicle length information can then be acquired based on the estimated vehicle type. The vehicle type of the other vehicle 61 may also be estimated by the frontal-face shape of the other vehicle 61 being detected from the intensity distribution of reflected waves received by the millimeter-wave radar 11. Estimation of a detailed vehicle type is not required. The estimation of the vehicle type may merely be performed to an extent enabling the estimation of classification, that is, a large-size vehicle, a medium-size vehicle, a compact vehicle, or the like. In this case, the reliability of the vehicle length information is set based on the accuracy of the estimation of vehicle type.

As a result, when highly reliable vehicle length information is acquired, the side-face mask 72 can be appropriately set and the edge points of the other vehicle 61 can be eliminated with certainty.

The shapes of the frontal-face mask 71, the side-face mask 72, and the distant mask 73 are not limited to squares, and may be appropriately set to shapes such as pentagons.

The frontal-face mask 71 is not required to completely cover the frontal face of the other vehicle 61. For example, the frontal-face mask 71 may not cover a predetermined area from the upper end of the frontal face of the other vehicle 61, as long as the upper end of the frontal-face mask 71 is set above the point at infinity when viewed from the own vehicle 60. In addition, the frontal-face mask 71 is not required to cover a predetermined area from the lower end of the frontal face.

The frontal face of the other vehicle 61 may be detected by only image processing or by only the millimeter-wave radar 11. In addition, the frontal face of the other vehicle 61 may be detected using another apparatus, such as a laser radar. Furthermore, the frontal face of the other vehicle 61 may be detected by image processing, the millimeter-wave radar 11, and another apparatus such as a laser radar being combined as appropriate.

The lateral width of the distant mask 73 may be a fixed value regardless of the curvature of the lane.

The distant mask 73 may not be set, and only the frontal-face mask 71 and the side-face mask 72 may be set.

What is claimed is:

1. A travel division line recognition apparatus mounted to an own vehicle, comprising:
   a processor configured to:
   extract a travel division line candidate from an image of a surrounding environment including a road, captured by an on-board camera mounted in the own vehicle, the travel division line candidate being a candidate for a travel division line on the road;
   calculate a degree of reliability that the travel division line candidate extracted by the processor will be the travel division line;
   select the travel division line candidate based on the degree of reliability calculated by the processor, and recognize the travel division line using the selected travel division line candidate; and
   recognize solid objects including vehicles, set a suppression area based on the recognized solid objects, and reduce the degree of reliability of the travel division line candidate present within the suppression area,
   the suppression area including:
   a frontal-face suppression area that is set so as to cover a frontal face of another vehicle in a position in which the frontal face has been recognized;
   a side-face suppression area that is set so as to cover a side face that is formed by extending the frontal-face suppression area in a depth direction by a predetermined vehicle length; and
   a distant suppression area that is set so as to cover an area beyond the predetermined vehicle length from the frontal-face suppression area and wider in a lateral direction than the frontal-face suppression area.

2. The travel division line recognition apparatus according to claim 1, wherein
   the processor sets a lateral width of the distant suppression area in the lateral direction based on a curvature of the road.

3. The travel division line recognition apparatus according to claim 2, wherein
   the processor sets the predetermined vehicle length to become longer as a lateral width of the recognized other vehicle becomes wider.

4. The travel division line recognition apparatus according to claim 2, wherein
   the processor acquires vehicle length information of the recognized other vehicle, and when a reliability of the acquired vehicle length information is higher than a predetermined threshold, sets the acquired vehicle length information using the acquired vehicle length information.

5. The travel division line recognition apparatus according to claim 4, wherein
   the processor acquires the vehicle length information from the recognized other vehicle through inter-vehicle communication.

6. The travel division line recognition apparatus according to claim 4, wherein
   the processor estimates a vehicle type of the recognized other vehicle, and acquires the vehicle length information based on the estimated vehicle type.

7. The travel division line recognition apparatus according to claim 1, wherein
   the processor sets the predetermined vehicle length to become longer as a lateral width of the recognized other vehicle becomes wider.

8. The travel division line recognition apparatus according to claim 1, wherein
   the processor acquires vehicle length information of the recognized other vehicle, and when a reliability of the acquired vehicle length information is higher than a predetermined threshold, sets the acquired vehicle length information using the acquired vehicle length information.

9. The travel division line recognition apparatus according to claim 8, wherein
the processor acquires the vehicle length information from the recognized other vehicle through inter-vehicle communication.

10. The travel division line recognition apparatus according to claim 8, wherein
the processor estimates a vehicle type of the recognized other vehicle, and acquires the vehicle length information based on the estimated vehicle type.

11. The travel division line recognition apparatus according to claim 1, wherein
a lateral width of the distant suppression area is increased as a curvature of a travel lane of the road increases.

12. The travel division line recognition apparatus according to claim 1, wherein
the processor extracts edge points having luminous change rates in a horizontal direction in the image of the surrounding environment; and
the processor determines whether or not the edge points are present in the frontal-face suppression area, the side-face suppression area and the distant suppression area.

13. A non-transitory computer-readable storage medium storing a travel division line recognition program for enabling a processor of a computer executing the travel division line recognition program to:
extract a travel division line candidate from an image of a surrounding environment including a road, captured by an on-board camera mounted in the own vehicle, the travel division line candidate being a candidate for a travel division line on the road;
calculate a degree of reliability that the travel division line candidate extracted by the processor will be the travel division line;
select the travel division line candidate based on the degree of reliability calculated by the processor, and recognize the travel division line using the selected travel division line candidate; and
recognize solid objects including vehicles, set a suppression area based on the recognized solid objects, and reduce the degree of reliability of the travel division line candidate present within the suppression area,
the suppression area including:
a frontal-face suppression area that is set so as to cover a frontal face of another vehicle in a position in which the frontal face has been recognized;
a side-face suppression area that is set so as to cover a side face that is formed by extending the frontal-face suppression area in a depth direction by a predetermined vehicle length; and
a distant suppression area that is set so as to cover an area beyond the predetermined vehicle length from the frontal-face suppression area and wider in a lateral direction than the frontal-face suppression area.

14. The non-transitory computer-readable storage medium according to claim 13, wherein
a lateral width of the distant suppression area is increased as a curvature of a travel lane of the road increases.

15. The non-transitory computer-readable storage medium according to claim 13, wherein
the processor is enabled to extract edge points having luminous change rates in a horizontal direction in the image of the surrounding environment; and
the processor is enabled to determine whether or not the edge points are present in the frontal-face suppression area, the side-face suppression area and the distant suppression area.

16. A travel division line recognition method comprising:
extracting, of a travel division line recognition apparatus mounted in an own vehicle, a travel division line candidate from an image of a surrounding environment including a road, captured by an on-board camera mounted in the own vehicle, the travel division line candidate being a candidate for a travel division line on the road;
calculating, with the processor of the travel division line recognition apparatus, a degree of reliability that the travel division line candidate extracted by the processor will be the travel division line; and
selecting, with the processor of the travel division line recognition apparatus, the travel division line candidate based on the degree of reliability calculated by the processor, and recognize the travel division line using the selected travel division line candidate,
recognizing, with the processor of the travel division line recognition apparatus, solid objects including vehicles,
setting, with the processor, a suppression area based on the recognized solid objects, the suppression area including:
a frontal-face suppression area that is set so as to cover a frontal face of another vehicle in a position in which the frontal face has been recognized;
a side-face suppression area that is set so as to cover a side face that is formed by extending the frontal-face suppression area in a depth direction by a predetermined vehicle length; and
a distant suppression area that is set so as to cover an area beyond the predetermined vehicle length from the frontal-face suppression area and wider in a lateral direction than the frontal-face suppression area; and
reducing, with the processor, the degree of reliability of the travel division line candidate present within the suppression area.

17. The travel division line recognition method according to claim 16, wherein
a lateral width of the distant suppression area is increased as a curvature of a travel lane of the road increases.

18. The travel division line recognition method according to claim 16, further comprising:
extracting, with the processor, edge points having luminous change rates in a horizontal direction in the image of the surrounding environment; and
determining, with the processor, whether or not the edge points are present in the frontal-face suppression area, the side-face suppression area and the distant suppression area.

* * * * *